United States Patent [19]

Herron

[11] Patent Number: 4,890,486
[45] Date of Patent: Jan. 2, 1990

[54] IN SITU DETERMINATION OF HYDROCARBON CHARACTERISTICS

[75] Inventor: Michael M. Herron, Ridgefield, Conn.

[73] Assignee: Schlumberger Technology Corp., New York, N.Y.

[21] Appl. No.: 297,735

[22] Filed: Jan. 13, 1989

Related U.S. Application Data

[63] Continuation-in-part of Ser. No. 574,753, Jan. 26, 1984, and Ser. No. 262,133, Oct. 24, 1988, which is a continuation of Ser. No. 574,481, Jan. 26, 1984, abandoned.

[51] Int. Cl.$^4$ .............................................. E21B 49/00
[52] U.S. Cl. ...................................................... 73/152
[58] Field of Search ............................ 73/152; 364/422; 250/253, 256, 270, 269

[56] References Cited

U.S. PATENT DOCUMENTS

| | | | |
|---|---|---|---|
| Re. 30,827 | 12/1981 | Pelef et al. | 73/152 |
| 3,336,476 | 8/1967 | Richardson | 250/262 X |
| 3,590,228 | 6/1971 | Barke . | |
| 3,746,871 | 7/1973 | Kramer et al. | 250/270 X |
| 3,928,762 | 12/1975 | Peelman | 250/270 X |
| 3,976,878 | 8/1976 | Cheralier et al. | 250/253 |
| 4,055,763 | 10/1977 | Antikiw | 250/270 |
| 4,071,755 | 1/1978 | Supernaw et al. | 250/253 |
| 4,095,102 | 6/1978 | Tixier | 250/265 |
| 4,096,385 | 6/1978 | Marett | 250/262 |
| 4,263,509 | 4/1981 | Fertl et al. | 250/255 |
| 4,369,497 | 1/1983 | Poupon et al. | 364/422 |
| 4,436,997 | 3/1984 | Allen | 250/256 |
| 4,446,369 | 5/1984 | Givens et al. | 250/270 |
| 4,464,569 | 8/1984 | Flaum | 250/270 |
| 4,464,930 | 8/1984 | Givens | 73/152 |

OTHER PUBLICATIONS

Lock, G. et al., National Gamma—Ray Spectral Logging, The Log Analyst, Sep.–Oct. 1971, pp. 3–9.
Tardy, Yves, Element Partition . . . Environments, Sci. Geol. Bull., 28, 1, 1975, pp. 59–95.
Ruckebusch, G., An Application . . . Logging, Proc. ICASSP 82, vol. 3, 1982, pp. 1866–1869.
Millhone, R., Completion Fluids . . . Art, J. Pest. Tech., Jan. 1983, pp. 47–55.
Everett, R. et al., Log Responses . . . Procedures, SPWLA 24th Ann. Logging Symp. Jun. 1983.
Poupon, A. et al., Log Analysis . . . Approach J. Pet. Tech., Jul. 1970, pp. 867–881.
Poupon A. et al., Log Analysis . . . Lithologies, J. Pest. Tech., Aug. 1971, pp. 995–1005.
Roberts, H. et al., The Application . . . Basin, 3rd Ann. European Formation Eval. Symp., Oct. '74.

Primary Examiner—Jerry W. Myracle
Attorney, Agent, or Firm—David P. Gordon; Peter Y. Lee

[57] ABSTRACT

Method for finding in situ the characteristics of oil are provided. The methods generally comprise logging the borehole to determine the total formation content of at least one element such as vanadium, sulfur or nickel associated with oil quality and determining how much of the total content is due to the occurrence of the element in the minerals of the earth formation and how much is due to the occurrence of the element in the oil. From the determination of how much of the element is in the oil, a characteristic of the oil at a depth in said borehole is found. In order to determine how much of the element is in the minerals of the earth formation, an equation relating the element to the minerals is required as well as a knowledge of which minerals are at the particular depth in the formation and in what quantities. The equation relating the minerals and element is obtained via a multiple regression analysis on elemental and mineralogical data.

20 Claims, 4 Drawing Sheets

IN SITU DETERMINATION OF HYDROCARBON CHARACTERISTICS

This is a continuation-in-part of U.S. Ser. No. 574,753, filed Jan. 26, 1984, and U.S. Ser. No. 262,133 filed Oct. 24, 1988 (continuation of U.S. Ser. No. 574,481 filed Jan. 26, 1984, now abandoned) both of which are assigned to the assignee hereof, and both of which are hereby incorporated by reference herein.

BACKGROUND OF THE INVENTION

The present invention relates generally to investigating earth formations traversed by a borehole. More particularly, the invention relates to methods for determining in situ the characteristics of hydrocarbons in a formation.

Prior to the disclosures of the parent applications hereof, lithological analyses of an earth formation which included mineral quantifications were not conducted by those skilled in the art solely by the logging of the earth formation. Such mineralogical analyses typically required core analysis. The disclosures of the parent applications, however, taught in broad terms that a mineralogical analysis of a formation could be obtained by logging the earth formation to find elemental quantities, and then by using the elemental information in an element-mineral transform to supply mineral quantities. The details of how to obtain the element-mineral transform were taught in U.S. Ser. No. 262,133 (parent application Ser. No. 574,481, now abandoned), as Well as in continuation-in-part applications therefrom, now issued U.S. Pat. Nos. 4,712,424, 4,722,220, which are hereby incorporated by reference herein.

Also taught in parent application Ser. No. 574,753 was that certain characteristics of the oil in the formation such as oil API gravity could also be determined via logging. In particular, it was recognized that if the total vanadium content of the formation could be determined by a logging tool, by knowing the mineralogical content of the formation and the relationship between certain minerals and vanadium, the vanadium content of the rock matrix could be determined; with the vanadium in the oil (the oil vanadium content corresponding to oil API gravity through a known equation) representing the difference between the determined total vanadium content and the vanadium in the rock matrix. In other words, using the teachings of the parent applications, a mineralogical analysis of the formation can be conducted by obtaining elemental concentrations and using an element-mineral transform. From a knowledge of the minerals of the formation, and using equations typically obtained via a multiple linear regression analysis, the quantity of a particular element due to its appearance in the minerals determined to be in the formation may be found. Then, knowing the total quantity of the particular element present in the formation as determined through elemental logging, and the quantity of the particular element in the rock matrix (minerals), the amount of the particular element in the formation fluids (e.g. oil) is easily determined.

While the parent application Ser. No. 574,753 particularly described a method for determining the vanadium content of oil in the formation, and a method for determining oil quality (API gravity) therefrom, the application did not detail that other chemical elements which are indicative of oil quality and characteristics could similarly be utilized.

SUMMARY OF THE INVENTION

It is therefore an object of the invention to determine in situ the characteristics of oil in a formation.

It is another object of the invention to determine in situ the characteristics of oil in a formation by logging the elemental content of the formation for at least one element other than oxygen, carbon, and uranium associated with oil quality, and from the elemental content and a mineralogical knowledge of the formation, determining the content of that at least one element in the oil.

It is a further object of the invention to determine in situ the characteristics of oil in a formation by logging the content of one or more of elemental sulfur, nickel, and vanadium, in the formation and separating the elemental content due to the rock matrix from the elemental content due to the oil.

In accord with the objects of the invention, the invention generally comprises logging the borehole to determine the total formation content of at least one element other than oxygen, carbon, and uranium associated with oil quality at a depth in the borehole, and determining for that depth how much of the total content at the location is due to the occurrence of that element in the minerals of the earth formation at said depth, and how much is due to the occurrence of the element in the oil. From the determination of how much of the element is in the oil, a characteristic of the oil at a depth in said borehole is found.

In order to determine how much of the element is in the minerals of the earth formation, an equation relating the element to different minerals is often required as well as a knowledge of which minerals are at the particular depth in the formation and in what quantities. Preferably, the mineral quantities are found by logging indications of a plurality of elements in the formation and utilizing an element-mineral transform developed according to any of the teachings of U.S. Ser. No. 262,133 (parent application Ser. No. 574,481, now abandoned), U.S. Pat. No. 4,712,424, and U.S. Pat. No. 4,722,220. The determination of how much of the element is in the minerals is preferably obtained via an equation derived from a multiple regression analysis which relates the element and the minerals.

While vanadium is one element useful in determining oil quality, sulfur and nickel have also been recognized as providing an indication of oil quality. An analysis of the relationship between nickel and the asphaltic content of hydrocarbons may be found in T. F. Yen, editor *The Role of Trace Metals in Petroleum*, Ann Arbor Science Publishers Inc. (Michigan, 1975). The relationship between oil sulfur content and oil quality is, of course, well known.

Additional objects and advantages of the invention will become apparent to those skilled in the art upon reference to the detailed description in conjunction with the accompanying drawings.

DETAILED DESCRIPTION OF THE PREFERRED EMBODIMENTS

Figure 1:
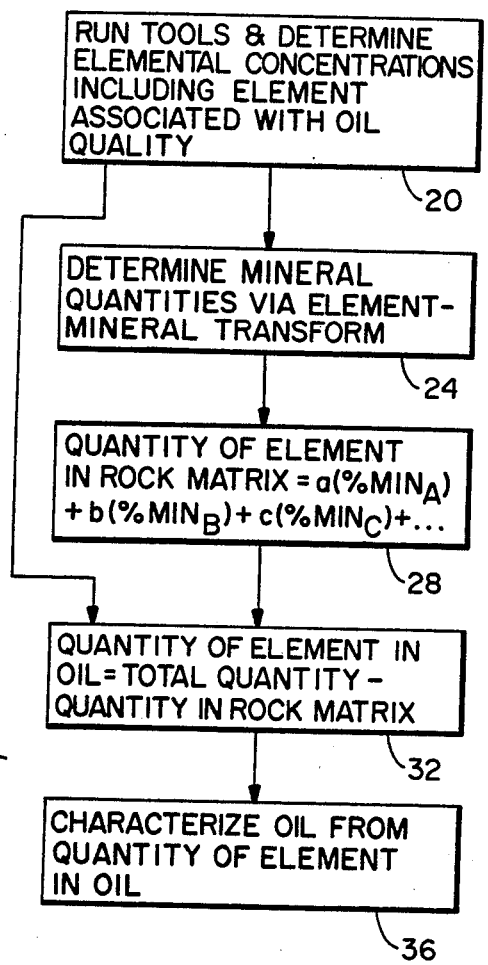
FIG. 1 is a flow diagram representing the broad method of the invention for determining hydrocarbon characteristics in situ.

Turning to FIG. 1, the basic flow diagram representing the broad method of the invention for determining hydrocarbon characteristics in situ is seen. In accord with U.S. Ser. No. 262,133 (parent application Ser. No. 574,481, now abandoned), and U.S. Pat. Nos. 4,712,424, 4,722,220 a decision is made as to which elemental concentrations are to be detected, and appropriate tools are run at 20 in a borehole. Among the tools run should be a tool capable of providing an indication of the content of an element which is associated with an oil characteristic (e.g. oil quality). In particular, as will be discussed in more detail hereinafter, one or more of the tools run downhole should be capable of measuring vanadium, sulfur, or nickel, and if sulfur is being detected, a determination of iron and/or calcium content is also desirable. While vanadium, sulfur and nickel are known to correlate well to oil quality (in an inverse manner), the invention is not intended to be limited to those particular elements, as the described methods should be amenable to the use of other elements associated with oil characteristics. On the other hand, the invention is not intended to include the determination of oil quality or hydrocarbon characteristics via the downhole detection of, and subsequent data processing of uranium, oxygen and/or carbon content, where the uranium, oxygen, or carbon content in the oil is indicative of a hydrocarbon characteristic or quality.

After the tools are run downhole at 20, the results of the logging (e.g. a determination of elemental concentrations) are input into an element-mineral transform in order to obtain at 24 a determination of mineral quantities. The exact transform utilized, and the manner of constructing such a transform are not critical hereto. However, preferably, the transform utilized is a matrix set forth in U.S. Pat. No. 4,722,220. It should be noted, that in particular circumstances, where a rough estimation of the concentration of the element associated with the oil quality is sufficient, the use of the element-mineral transform is not required, and cross plots of certain elements and the element associated with the oil characteristic may suffice to provide such rough estimations.

Where mineral quantity determinations are made at 24, the next step 28 is to provide a determination of how much of the content of the element associated with the oil quality and detected at 20 is due to its occurrence in the rock minerals vis-a-vis how much of the content is situated in the oil. One manner of making such a determination is to previously determine which of the minerals contain the element. Then, having utilized a multiple regression analysis on a data base of element concentrations and mineral quantities, a derived equation which equates the quantity of an element in the rock matrix to the occurrence of particular minerals in the rock matrix would be available. As seen at step 28, such an equation may take the form of a simple linear function. With such an equation, and a knowledge of the mineral quantities from step 24, the determination of the amount of the element due to the rock is found. Then, by subtracting that amount from the total content of the element found at 20, a determination is made at 32 regarding the content of the element in the oil. An oil characteristic is then found at 36 according to one or more equations or charts which relate the oil characteristic to the amount of the particular element found in the oil.

Figure 2:
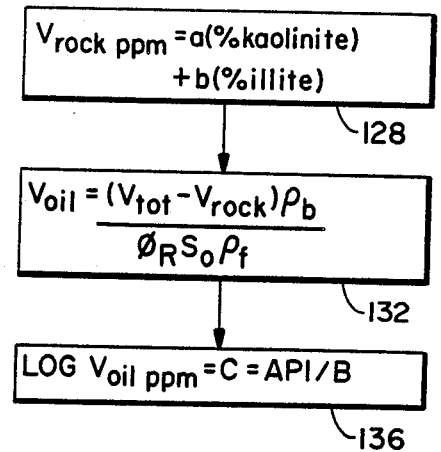
FIG. 2 is a flow diagram representing a method for determining the API gravity of oil in situ by logging vanadium indications.

Turning to FIG. 2, the application of the method set forth in FIG. 1 for determining oil API gravity via use of a vanadium content determination is seen. At 120, besides whatever other tools are being run, a tool (such as an enhanced resolution tool) for finding vanadium content is run. At 124, the quantity of at least kaolinite and illite in the formation is found according to an element-mineral transform such as disclosed in U.S. Pat. No. 4,722,220. Then, at 128, the amount of vanadium in the rock is preferably found according to an equation previously constructed via a multiple regression analysis relating vanadium to minerals: $V_{rock\ (ppm)} = 80$ ppm (wt % kaolinite) + 250 ppm (wt % illite) From the vanadium content of the rock and the total vanadium detected, the vanadium concentration in the oil may be determined in ppm at 132 according to $$V_{oil\ (ppm)} = (V_{tot} - V_{rock})\rho_b / \phi_R S_o \rho_{fluid}$$

where $\phi_R$ is the formation porosity, $\rho_b$ is the matrix or bulk density, and $S_o$ is the oil saturation. The API gravity of the oil is then easily derived at 136 according to the well known equation $\log V_{oil\ (ppm)} = C - (API/B)$, where C and B are constants known for different oil reservoirs, or according to other suitable relationships.

While the method set forth in FIG. 2 derives the vanadium content in the oil in a preferred manner, another manner of derivation is set forth in parent application Ser. No. 574,753. As disclosed therein, the total detected vanadium and aluminum contents are cross-plotted on a graph having non-zero sloped line. If the plotted point lies on the line, all of the vanadium is assumed to be from the minerals, while if the point lies on the vanadium axis, all of the vanadium is assumed to be in the oil. Points lying between the vanadium axis and the line have vanadium contributions both from the minerals and the oil. The amount contributed by each is found by projecting the plotted point to the line. The vanadium axis value of the intersection of the projection with the line provides the amount of vanadium due to the minerals, while the vanadium axis value of the plotted point minus the amount due to the minerals is due to the oil. Additional details may be seen with reference to FIG. 3b of parent application Ser. No. 574,753.

Figure 3:
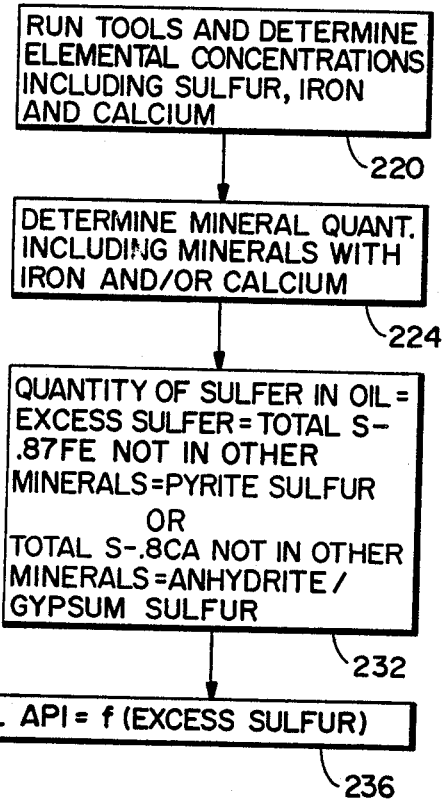
FIG. 3 is a flow diagram representing a method for determining the API gravity of oil in situ by logging sulfur indications.

Turning to FIG. 3 herein, a method for determining oil API via the logging of sulfur content is seen. While in a few environments, sulfur is found in massive deposits as elemental sulfur, typically sulfur is only found in pyrite, anhydrite, gypsum and oil. Thus, ignoring the massive elemental sulfur deposit situation, a determination of the amounts of each mineral (i.e. pyrite, and anhydrite/gypsum) present in the formation is desirable. Pyrite is determinable from its sulfur and iron contents, while anhydrite and gypsum are determinable from their calcium and sulfur contents. As a result, the quantity of pyrite or anhydrite and gypsum in the formation can be determined from the iron and calcium content of the formation. Other means of estimating pyrite and/or anhydrite and gypsum abundances from logging measurements may also apply.

With this information, and in accord with the provided embodiment, one or more logging tools, including at least a tool such as induced gamma ray spectroscopy tools disclosed in U.S. Pat. No. 4,055,703 to Antkiw and U.S. Pat. No. 3,521,064 to Moran which is capable of finding sulfur, iron, and calcium content, are run downhole at 220. In one embodiment of the invention, the elemental concentration information obtained at 220 is input into an elemental-mineral transform at 224 to find the quantity of minerals other than pyrite, anhydrite, and gypsum, which contain calcium or iron that are present in the formation. With this information, the amount of iron and calcium respectively due to pyrite and anhydrite/gypsum (i.e. the remaining iron and calcium) can then be found at 226 via a previously derived equation. Of course, if other information regarding the quantity of dolomite, calcite, and other carbonates is known (such as via a neutron-density cross-plot), the analysis at 224 and 226 may be unnecessary as the excess calcium due to the anhydrite/gypsum may be found by subtracting the calcium in dolomite, calcite, etc. from the total detected calcium. Likewise, the iron content due to pyrite may be obtainable without steps 224 ad 226 by cross-plotting the iron concentration with potassium, aluminum or any other element which would provide an indication as to how much iron is due to the mineral illite, and subtracting that value from the total detected iron.

Figure 4:
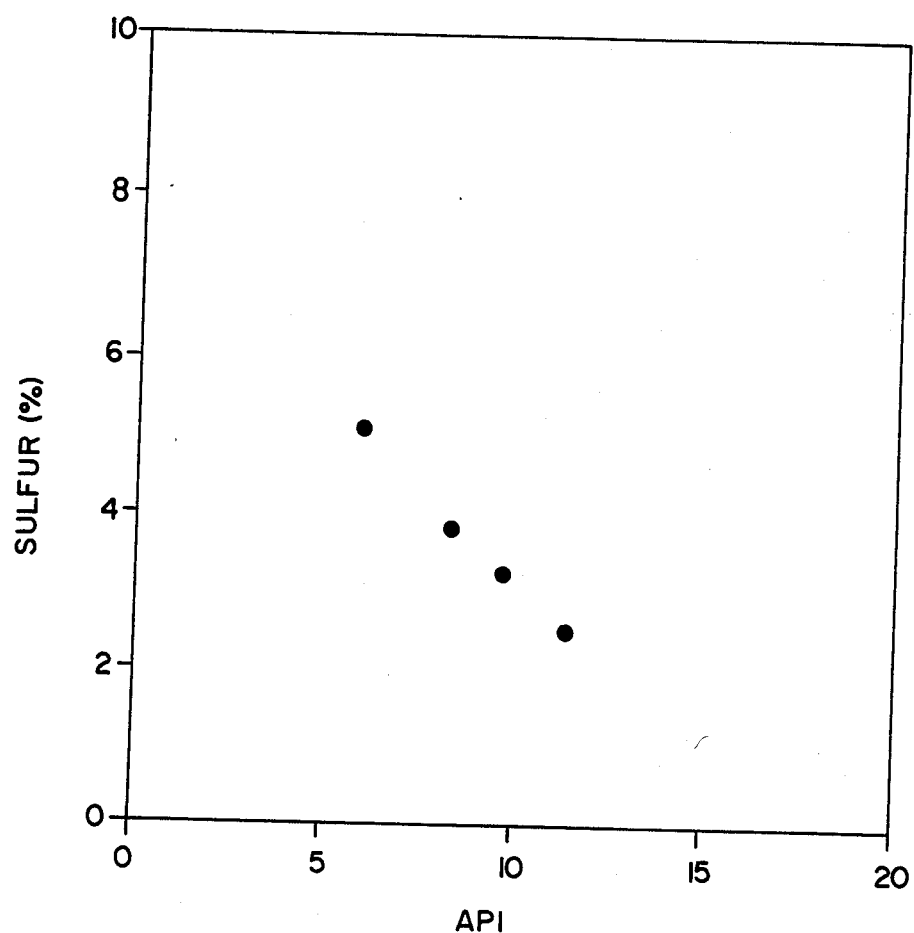
FIG. 4 is a cross-plot showing the relationship between excess sulfur in the oil and oil API gravity.

Regardless of how the amount of iron and calcium in pyrite and anhydrite/gypsum is found, the sulfur content due to the pyrite and anhydrite/gypsum may then be determined at 232 by equations relating the weight percentages of sulfur and iron in pyrite and sulfur and calcium in anhydrite and gypsum. Thus, the amount of sulfur in pyrite is set equal to 0.87 times the amount of pyrite-related iron, while the amount of sulfur in either gypsum or anhydrite is equal to 0.80 times the amount of gypsum or anhydrite-related calcium. The excess sulfur which is found in the oil is equal to the total detected sulfur minus 0.87 times the pyrite-related iron content minus 0.8 times the anhydrite or gypsum-related calcium content. Because in typical formations, pyrite does not coexist with either gypsum or anhydrite, two simpler equations result The excess sulfur is equal to total sulfur minus 0.87 times the pyrite-related iron content, or total sulfur minus, 0.80 times the anhydrite/gypsum-related calcium content. A determination of oil API gravity may then be had at 236, as the sulfur content and oil API gravity are directly related as seen in FIG. 4.

Figure 5:
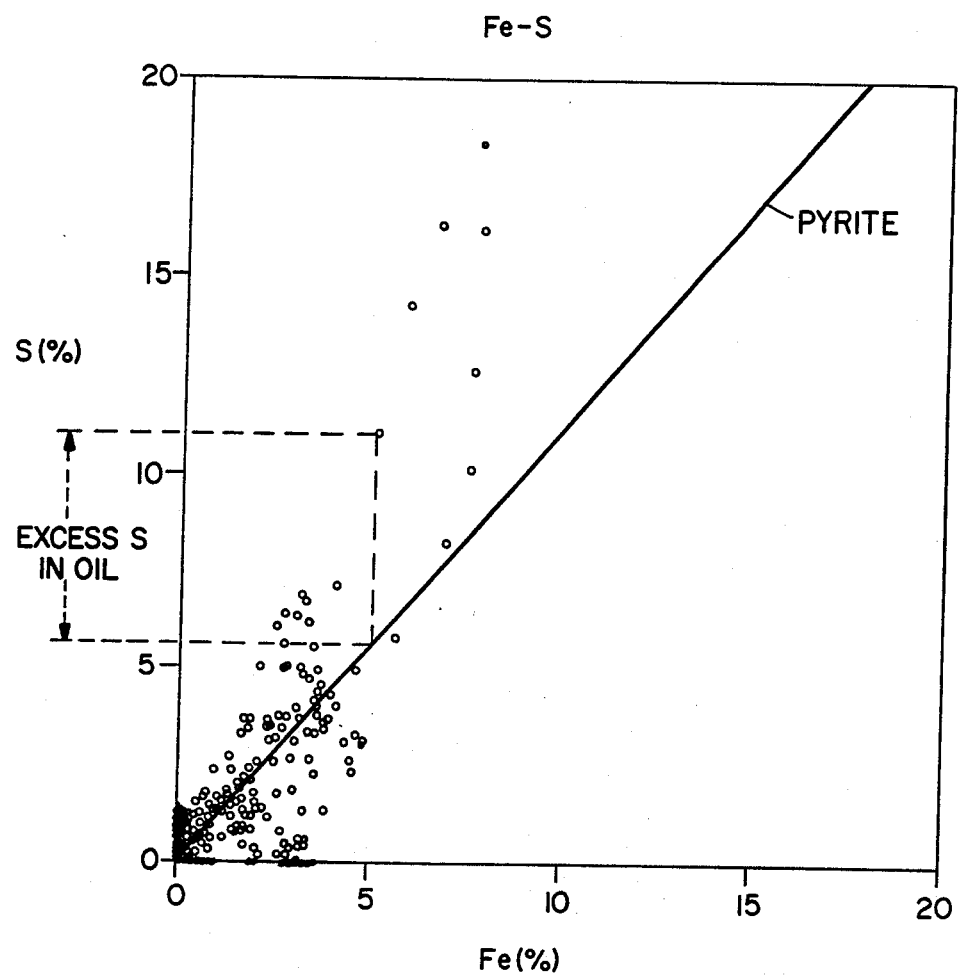
FIG. 5 is a cross-plot of iron and sulfur content from which excess sulfur may be determined relative to a pyrite line.

Another simpler method of determining an excess sulfur content is seen with reference to FIG. 5. In FIG. 5, sulfur and iron concentrations as detected for a particular borehole are cross-plotted with the provided line indicative of pyrite. As a first pass, if a point corresponding to detected sulfur and iron concentrations lies on or below the pyrite line, it is assumed that all of the detected sulfur is due to the pyrite in the formation. If the point lies above the pyrite line but shows a positive iron content (i.e. pyrite is present, and hence gypsum and anhydrite are not present), it is assumed that there is excess sulfur in the oil. A determination of the sulfur in the oil is made by projecting the plotted point to the pyrite line. The sulfur (y) axis value of the intersection of the projection with the pyrite line provides the amount of sulfur due to the pyrite, while the sulfur (y) value of the plotted point minus the amount due to the pyrite is due to the oil. This determination provides a minimum estimate of the sulfur in the oil, as it assumes that all of the iron present is being associated with pyrite (e.g. the pyrite content is maximized). If desired, a determination of the amount of iron due to other sources (e.g. illite) may be conducted, and the iron axis value of the plotted point may be correspondingly adjusted. Then, a more accurate determination of the sulfur in the oil results.

If the plotted point in FIG. 5 lies along the sulfur axis, it may be assumed that there is no pyrite in the formation. A determination is then preferably made as to whether the detected sulfur might be due to anhydrite and/or gypsum. Such a determination may be had roughly by providing a sulfur-calcium cross-plot and following the steps described above with reference to the sulfur-iron cross-plot. Again, a minimum estimate of the excess sulfur in the oil would result if the calcium content were not corrected for the calcium content due to dolomite, calcite, and other calcium-bearing minerals in the formation.

Figures 6A, 6B:
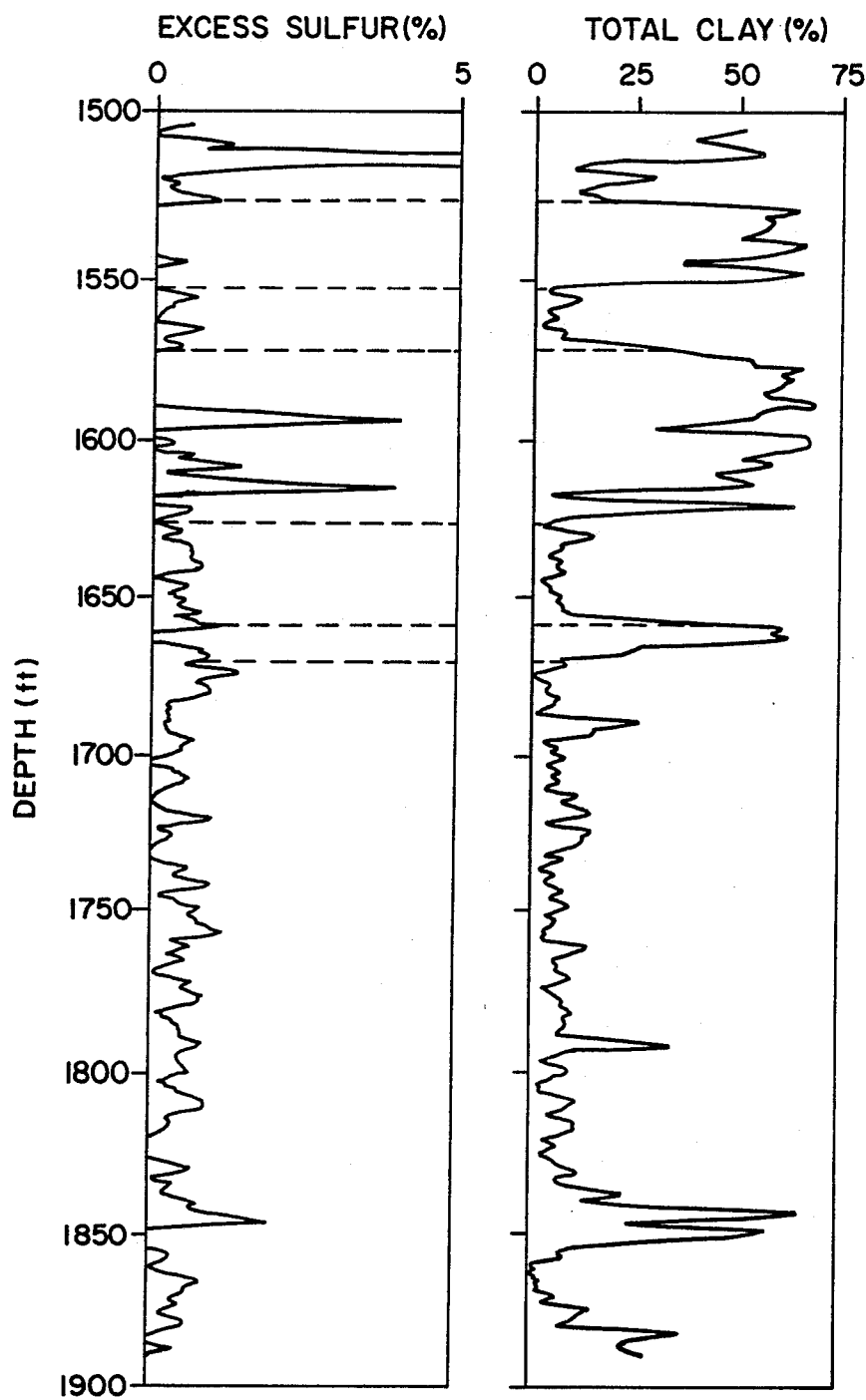
FIGS. 6a and 6b are logs of a borehole respectively showing excess sulfur and total clay content over borehole depth.

FIG. 6a provides the excess sulfur determinations made over four hundred feet in a borehole using the cross-plot of FIG. 5 and the simple first pass analysis. FIG. 6b provides the total clay content of the formation over the four hundred foot depth as determined via the mineralogical analysis techniques of U.S. Pat. Nos. 4,712,424, and 4,722,220. As is readily evident, except for four locations of considerable excess sulfur which occur due to coal deposits (depths 1510–1515; 1588–1591; 1610–1613; and 1843–1848), the larger excess sulfur contents are generally found where the total clay content is relatively low (e.g. depths 1553–1572; 1627–1660; and generally from 1675–1825). Such zones are indicative of formation sands which are more apt to contain oil than the formation clays (shales). Conversely, very little excess sulfur is typically found where total clay content is high (e.g. depths 1527–1553; generally in 1574–1626; and 1662–1670). Thus, FIG. 6b confirms the analysis of FIG. 6a regarding the existence of excess sulfur.

There has been described and illustrated herein methods for the in situ determination of oil characteristics. While particular embodiments have been described it is intended that the invention be broad in scope and that the specification be read likewise. Thus, while particular elements (vanadium, sulfur, and nickel) were described as being associated with the oil quality characteristic, and particular methods regarding vanadium and sulfur were described, those skilled in the art will appreciate that the invention is intended to encompass the detection of other elements other than oxygen, carbon, and uranium which might be associated with an oil characteristic and which are found in the rock matrix and oil of the formation. Also, while oil quality as measured by API gravity was described as a characteristic of oil, those skilled in the art will recognize that other oil characteristics exist, and that the invention is not intended to be limited simply to the determination of oil API gravity. Thus, it will be appreciated that yet other changes and modifications may be made to the invention as described in the specification without departing from the spirit and scope of the invention as so claimed.

I claim:

1. A method for investigating in situ a characteristic of oil in an earth formation traversed by a borehole, comprising:
    (a) logging said earth formation with a borehole tool and determining an indication of the total formation content of at least one element other than oxygen, carbon, and uranium associated with said oil characteristic for at least one depth in said borehole;

(b) deriving from said total formation content of said at least one element, a content of said at least one element in said oil at said depth in said borehole.

2. A method according to claim 1, wherein: said content of said at least one element in said oil is derived by
(1) finding the rock matrix content of said at least one element, and
(2) utilizing said rock matrix content and said total formation content to derive said content of said at least one element in said oil.

3. A method according to claim 2, wherein: said step of finding the rock matrix content of said at least one element comprises finding a quantity in said formation of at least one mineral containing said at least one element, and inputting said quantity into a predetermined equation to derive said rock matrix content.

4. A method according to claim 3, wherein: said predetermined equation is constructed using multiple linear regression analysis on elemental and mineralogical data.

5. A method according to claim 4, wherein: said step of finding a quantity in said formation of at least one mineral comprises logging said borehole to determine the content of one or more index elements, and operating with an element-mineral transform to provide the said quantity of at least one mineral.

6. A method according to claim 5, wherein: said element-mineral transform is an element-mineral matrix constructed using regression analysis.

7. A method according to claim 2, wherein: said at least one element is chosen from at least one of vanadium, sulfur, and nickel.

8. A method according to claim 7, wherein: said at least one element is at least sulfur, and the step of finding the rock matrix elemental content of sulfur comprises, finding the total elemental content of iron at said depth in said borehole, defining at least a portion of the total sulfur content as a rock matrix sulfur content according to a relationship relating iron and sulfur in a rock matrix mineral.

9. A method according to claim 8, wherein: said at least one element is at least sulfur, and said step of finding the rock matrix elemental content of sulfur further comprises, finding the total elemental content of calcium at said depth in said borehole, defining at least a portion of the total calcium content as a rock matrix calcium content according to a relationship relating iron and calcium in a second rock matrix mineral.

10. A method according to claim 7, wherein: said at least one element is at least sulfur, and the step of finding the rock matrix elemental content of sulfur comprises finding the elemental content of iron related to a mineral pyrite at said depth in said borehole, defining at least a portion of the total sulfur content as a sulfur pyrite content according to a relationship relating iron and sulfur in pyrite.

11. A method according to claim 10, wherein: said step of finding the elemental content of iron related to pyrite comprises finding the total iron content in said formation at said depth in said borehole, relating a portion of said total iron content to at least one mineral other than pyrite, and subtracting said related portion of said total iron content from said total iron content to provide the elemental content of iron related to pyrite.

12. A method according to claim 10, wherein: said step of finding the elemental content of iron related to pyrite comprises finding the total iron content in said formation at said depth in said borehole, finding the quantity of at least one mineral containing iron other than pyrite, determining from said quantity of said mineral other than pyrite the amount of iron associated with said mineral other than pyrite, and subtracting said amount of iron associated with said mineral other than pyrite from said total iron content to provide the elemental content of iron related to pyrite.

13. A method according to claim 12, wherein: said at least one mineral other than pyrite comprises illite.

14. A method according to claim 7, wherein: said at least one element is at least sulfur, and the step of finding the rock matrix elemental content of sulfur comprises, finding the total elemental content of calcium at said depth in said borehole, defining at least a portion of the total calcium content as a rock matrix calcium content according to a relationship relating iron and calcium in a rock matrix mineral.

15. A method according to claim 7, wherein: said at least one element is at least sulfur, and the step of finding the rock matrix elemental content of sulfur comprises, finding the elemental content of calcium related to minerals anhydrite or gypsum at said depth in said borehole, defining at least a portion of the total sulfur content as a sulfur anhydrite or sulfur gypsum content according to a relationship relating calcium ad sulfur in anhydrite.

16. A method according to claim 15, wherein: said step of finding the elemental content of calcium related to anhydrite or gypsum comprises finding the total calcium content in said formation at said depth in said borehole, finding the quantity of at least one mineral containing calcium other than anhydrite and gypsum, determining from said quantity of said mineral other than anhydrite and gypsum the amount of calcium associated with said mineral other than anhydrite and gypsum, and subtracting said amount of calcium associated with said at least one mineral other than anhydrite and gypsum from said total calcium content to provide the elemental content of calcium related to anhydrite and gypsum.

17. A method according to claim 2, wherein: said at least one element is sulfur, and said characteristic of oil is API gravity which is determined according to a relationship relating sulfur content of said oil and said API gravity.

18. A method for investigating in situ, through logging, at least one characteristic of oil in an earth formation traversed by a borehole, comprising:
  (a) determining at a depth of said borehole in said formation, the total content of at least one element other than oxygen, carbon, and uranium associated with said at least one oil characteristic by logging said borehole with at least one logging tool;
  (b) determining for at least said depth, the content of said at least one element associated with the rock matrix of said formation; and
  (c) deriving from said total content and said rock matrix content, the quantity of said at least one element in the oil of said formation at said borehole depth.

19. A method according to claim 18, wherein:
said at least one element comprises sulfur, and
said step of determining the content of said at least one element associated with the rock matrix comprises finding the total elemental content of at least one of iron and calcium at said depth in said borehole, and defining at least a portion of the total sulfur content as a rock matrix sulfur content according to at least one of a relationship relating iron and sulfur in pyrite and a relationship relating iron and calcium in at least one of anhydrite and gypsum.

20. A method according to claim 19, wherein:
said portion of the total sulfur content defined as a rock matrix sulfur content is defined by relating at least a portion of at least one of said total iron and said total calcium to at least minerals other than pyrite and anhydrite and gypsum, and by relating at least one of the remaining iron and calcium to sulfur to provide at least one of a pyrite and an anhydrite/gypsum sulfur content.

* * * * *